United States Patent
Johnson et al.

(12) 
(10) Patent No.: US 6,565,443 B1
(45) Date of Patent: May 20, 2003

(54) SYSTEM AND METHOD FOR VERIFYING THE CONTENTS OF A MASS STORAGE DEVICE BEFORE GRANTING ACCESS TO COMPUTER READABLE DATA STORED ON THE DEVICE

(75) Inventors: Peter J. Johnson, Reno, NV (US); Eric Brendall, Reno, NV (US)

(73) Assignee: Innovative Gaming Corporation, Las Vegas, NV (US)

( * ) Notice: Subject to any disclaimer, the term of this patent is extended or adjusted under 35 U.S.C. 154(b) by 0 days.

(21) Appl. No.: 09/396,821

(22) Filed: Sep. 14, 1999

(51) Int. Cl.[7] .......................... G06F 19/00; G06F 12/14
(52) U.S. Cl. .......................... 463/43; 713/193; 705/57; 714/36
(58) Field of Search .................. 463/29, 43, 44, 463/45; 705/57, 58, 51; 713/1, 2, 187, 189, 193; 380/2, 251; 714/36, 699, 758; 707/1, 6

(56) References Cited

U.S. PATENT DOCUMENTS

| | | | |
|---|---|---|---|
| 4,593,376 A | | 6/1986 | Volk |
| 4,727,544 A | * | 2/1988 | Brunner et al. ............... 371/21 |
| 4,805,090 A | | 2/1989 | Coogan |
| 4,905,280 A | | 2/1990 | Wiedner |
| 4,908,861 A | * | 3/1990 | Brachtl et al. ................ 380/25 |
| 4,922,420 A | | 5/1990 | Nakagawa et al. |
| 5,150,407 A | * | 9/1992 | Chan ............................ 380/4 |
| 5,263,152 A | | 11/1993 | Smith et al. |
| 5,326,104 A | | 7/1994 | Pease et al. |
| 5,418,852 A | * | 5/1995 | Itami et al. .................... 380/4 |
| 5,421,006 A | * | 5/1995 | Jablon et al. ................. 714/36 |
| 5,535,188 A | * | 7/1996 | Dang et al. ................... 369/84 |
| 5,539,879 A | | 7/1996 | Pearce et al. |
| 5,556,108 A | | 9/1996 | Nagano et al. |
| 5,599,232 A | | 2/1997 | Darling |
| 5,611,730 A | | 3/1997 | Weiss |
| 5,624,316 A | | 4/1997 | Roskowski et al. |
| RE35,520 E | | 5/1997 | Darling et al. |
| 5,630,093 A | | 5/1997 | Holzhammer et al. |
| 5,643,086 A | * | 7/1997 | Alcorn et al. .................. 463/29 |
| 5,692,162 A | | 11/1997 | Okawa |
| 5,729,679 A | | 3/1998 | Nelson |

(List continued on next page.)

OTHER PUBLICATIONS

"Storybook Fantasy—New Gaming Device Submittal and Compliance Report", *Innovative Gaming, Inc.*, 88 pgs. (Feb. 23, 1999).

*Primary Examiner*—Mark Sager
*Assistant Examiner*—Steven Ashburn
(74) *Attorney, Agent, or Firm*—Merchant & Gould PC

(57) ABSTRACT

A system and method for verifying the contents of a mass storage device attached to a computing system having a processor and system random access memory. The computing system is preferably used as part of a computer controlled gaming machine. The mass storage device has computer readable data stored therein. First, a mass storage verification module having a set of computer executable instructions for use in verifying the contents of the mass storage device is storing onto the mass storage device. Next, the method mass storage verification data for use in verifying the contents of the mass storage device is also stored onto the mass storage device. Before permitting an initial access to the computer readable data from the mass storage device contents of the mass storage device is verified by executing the instructions contained within the mass storage verification module to generate a set of computed verification data and comparing the set of computed verification data with the mass storage verification data. Finally, additional access to the computer readable data stored on the mass storage device is allowed only if the set of computed verification data matches the mass storage verification data.

39 Claims, 6 Drawing Sheets

U.S. PATENT DOCUMENTS

| | | | |
|---|---|---|---|
| 5,742,934 A | | 4/1998 | Shinohara |
| 5,745,678 A | * | 4/1998 | Herzberg et al. ........... 395/186 |
| 5,759,104 A | | 6/1998 | Shirae et al. |
| 5,851,149 A | | 12/1998 | Xidos et al. |
| 5,935,242 A | * | 8/1999 | Madany et al. ................ 713/1 |
| 5,959,596 A | | 9/1999 | McCarten et al. |
| 5,967,895 A | | 10/1999 | Kellen |
| 5,970,143 A | | 10/1999 | Schneier et al. |
| 5,996,033 A | | 11/1999 | Chiu-Hao |
| 6,006,319 A | | 12/1999 | Takahashi et al. |
| 6,042,478 A | | 3/2000 | Ng |
| 6,048,270 A | | 4/2000 | Chiu-Hao |
| 6,071,191 A | * | 6/2000 | Takeda et al. ................ 463/29 |
| 6,141,756 A | * | 10/2000 | Bright et al. ................ 713/200 |
| 6,154,186 A | | 11/2000 | Smith et al. |
| 6,167,461 A | | 12/2000 | Keats et al. |
| 6,175,924 B1 | * | 1/2001 | Arnold ....................... 713/189 |
| 6,263,348 B1 | * | 7/2001 | Kathrow et al. ........... 707/203 |
| 6,290,604 B2 | | 9/2001 | Miyamoto et al. |
| 6,311,238 B1 | | 10/2001 | Hebert |
| 6,347,355 B1 | | 2/2002 | Kondo et al. |
| 6,386,979 B1 | | 5/2002 | Ho et al. |
| 2001/0014933 A1 | | 8/2001 | Shibazaki et al. |
| 2002/0095549 A1 | | 7/2002 | Matsunami et al. |

* cited by examiner

FIG. 4

Mass Storage Verification Data

| File Name | File Start Location | File Size | 16-Bit CRC Checksum |
|---|---|---|---|
| Operating System File #1 | Track 1, Block 1 | 2048 | FFEA |
| Operating System File #2 | Track 2, Block 2 | 2048 | 1267 |
| ... | | | |
| Operating System File #N | Track F2, Block 3 | 2048 | A56C |
| Application Module File #1 | Track 5, Block 1 | 2048 | 5597 |
| Application Module File #2 | Track 7, Block 1 | 2048 | 2D9A |
| ... | | | |
| Application Module File #M | Track A1, Block 5 | 2048 | 1112 |
| Application Module Data File #1 | Track 55, Block 2 | 2048 | 9833 |
| Application Module Data File #2 | Track 4F, Block 6 | 2048 | E12D |
| ... | | | |
| Application Module Data File #L | Track 33, Block 1 | 2048 | 02DE |
| Mass Storage Verification Module | Track 7E, Block 3 | 2048 | A678 |
| Mass Storage Verification Data | Track 97, Block 2 | 2048 | 2D02 |

401

SYSTEM AND METHOD FOR VERIFYING THE CONTENTS OF A MASS STORAGE DEVICE BEFORE GRANTING ACCESS TO COMPUTER READABLE DATA STORED ON THE DEVICE

FIELD OF THE INVENTION

This invention relates to a general system and method for verifying the contents of a mass storage device before granting access to computer readable data stored on the device. More particularly, this invention relates to a method and apparatus verifying the contents of a read-only mass storage device as part of a booting process of a computer system that is part of a computer controlled gaming machine before granting access to gaming application modules and data stored on the device.

BACKGROUND OF THE INVENTION

Computer-based gaming machines are becoming increasingly commonplace in the construction of gaming devices such as slot machines, video poker games, and video roulette wheels. These automated games utilize computing systems containing software modules to implement gaming logic. These computing systems also utilize computer video display devices and other computer controlled display devices to present gaming players with images of the various gaming apparatus being implemented.

These computer-based gaming systems replace mechanical systems such as slot machines comprising a plurality of rotating wheels and associated mechanical logic. The computing systems utilize a random number generator to determine a game outcome that statistically appears to be random in nature. The random numbers obtained from a random number-generating module are used to determine which symbols on the wheels of a slot machine are to be displayed when the game concludes a play. Similarly, these random numbers are used to shuffle standard decks of playing cards used in other games of chance.

These computer-based gaming machines also comprise software modules which when working together implement the rules of a particular game of chance. For a slot machine, these rules include the pay-out tables used to determine any winnings paid to a player for a particular combination of symbols shown on the rotating game wheels. Finally, the computer gaming machines comprise software modules which when working together display a series of images on the display device to simulate the appearance and operation of a gaming machine. These display modules typically comprise both video and audio output modules to provide a game player with a sensory experience comparable to the mechanical gaming machines.

Gaming machines that accept wagers and provide winning payouts are under a wide variety of regulatory oversight procedures and provisions from authorities of the various jurisdictions that permit the use of these devices. These oversight procedures and provisions are concerned in part with providing a level of assurance that the games operate in the manner advertised. The behavior of the random number generator, its relationship to the outcome of the game implemented, and the winning pay-out tables are part of the functions of these gaming devices which are inspected. The procedures for obtaining regulatory approval for each gaming device may be a long, complicated, and expensive undertaking on the part of the gaming machine manufacturer and its customers, gaming establishment operators.

At the same time, these computer controlled gaming machines are becoming based upon standard computing system components to reduce the cost of the development and deployment of these gaming machines. This reduction in cost occurs from the ability to develop multiple gaming machine implementations based upon a single gaming machine architecture. As part of the effort to allow the development of multiple gaming machine implementations based upon a single computer based gaming machine architecture, two additional inventions have been developed. The technical description of these computer controlled gaming machines may be found in detail in co-pending U.S. Patent Application, entitled, Method and Apparatus for Providing a Compartmentalized Game Instruction Architecture within a Gaming Machine, Ser. No. 09/396,190, which is concurrently filed with the present application and is incorporated by reference in its entirety herein., and in co-pending U.S. Patent Application, entitled, System and Method of Distributing Casino Games, Employing Platform Independent Programming and Common Communications Protocols, Ser. No. 60/153,718, which is also concurrently filed with the present application and is also incorporated by reference in its entirety herein.

One issue which may prevent the use of a computer-based gaming machine from one game implementation to a second gaming implementation is the regulatory oversight approval for each gaming implementation. Part of this regulatory approval involves the inspection and approval of the software routines and data files needed to implement a computer gaming machine on storage media that can be loaded into the gaming machines. Typically, the only storage media allowed by the regulators have been read-only memories such as ROMs and EPROMs. Because of the large amount of video and audio data needed to implement a computer controlled gaming machine, larger forms of mass storage will be needed. However, a procedure is needed to verify the approved media that is inspected by the regulators is used each time a computer controlled gaming machine operates.

Additionally, the process of obtaining approval for a complete software implementation of a gaming device that operates on a common computer-based gaming platform having a standard set of hardware components may be simplified with a software architecture that structures its software modules into an organization which re-uses a large amount of its software modules to implement functions common to all gaming devices. With such a software architecture, the common software modules would seek approval the first time the modules are used in a gaming machine. For subsequent game machine implementation, the prior approval for the common module would be provided along with any changes implemented to the modules. Additionally, new modules used to implement game specific functions would be identified. As such, the previously approved common modules that may not change in a significant way may obtain approval more quickly and less expensively. The process of obtaining the approval for new gaming implementations may likely focus on the new game-specific modules. Since these modules represent a subset of an entire system, the approval may be obtained more quickly and less expensively.

With the ability to more easily obtain approval for new gaming implementations and the ability to use large storage media that are easily changed from one game to another while meeting the demands of the regulators, gaming establishments are provided with an improved ability to more readily change the gaming devices present in their establishments to satisfy the interests of their gaming players. The present invention provides a software architecture for implementing computer-based gaming machines to address the above problems in prior systems.

SUMMARY OF THE INVENTION

To overcome the limitations in the prior art described above, and to overcome other limitations that will become apparent upon reading and understanding the present specification, the present invention discloses a method for verifying the contents of a mass storage device before granting access to computer readable data stored on the device.

The present invention solves the above-described problems by providing a method and apparatus verifying the contents of a read-only mass storage device such as a CD-ROM drive as part of a booting process of a computer system where the computing system is part of a computer controlled gaming machine before granting access to gaming application modules and data stored on the device.

Other embodiments of a system in accordance with the principles of the invention may include alternative or optional additional aspects. One such aspect of the present invention is a method for verifying the contents of a mass storage device attached to a computing system having a processor and system random access memory. The mass storage device has computer readable data stored therein. The method comprises first storing onto the mass storage device a mass storage verification module having a set of computer executable instructions for use in verifying the contents of the mass storage device. Next, the method stores a mass storage verification data for use in verifying the contents of the mass storage device onto the mass storage device. Before permitting an initial access to the computer readable data from the mass storage device, the method verifies the contents of the mass storage device by executing the instructions contained within the mass storage verification module to generate a set of computed verification data and comparing the set of computed verification data with the mass storage verification data. Finally, the method permits additional access to the computer readable data stored on the mass storage device only if the set of computed verification data matches the mass storage verification data.

Another aspect of the present invention is a method for booting a computing system having a processor, a mass storage device, and system random access memory. The mass storage device containing computer readable data. The method includes storing onto the mass storage device a mass storage verification module having a set of computer executable instructions for use in verifying the contents of the mass storage device, storing onto the mass storage device a mass storage verification data for use in verifying the contents of the mass storage device, storing a plurality of operating system modules having a set of computer executable instructions within a file system on the mass storage device, loading the operating system modules needed to access the computer readable data stored on the mass storage device into the random access memory of the computing system, verifying the contents of the mass storage device by executing the instructions contained within the mass storage verification module to generate a set of computed verification data, and permitting additional access to the computer readable data stored on the mass storage device only if the set of computed verification data matches the mass storage verification data. The set of computed verification data comprises a file name, a file starting location on the mass storage device, a file size, and a CRC checksum for each file stored on the mass storage device.

Another aspect of the present invention is a method for booting a computer controlled gaming machine having a computing system. The computer controlled gaming machine has a processor, a mass storage device, and system random access memory where the mass storage device contains computer readable data organized within a file system. The method for booting the gaming machine comprises storing onto the mass storage device a mass storage verification module having a set of computer executable instructions for use in verifying the contents of the mass storage device, storing onto the mass storage device a mass storage verification data for use in verifying the contents of the mass storage device, storing a plurality of operating system modules having a set of computer executable instructions within the file system on the mass storage device, and storing one or more gaming application modules having a set of computer executable instructions within the file system on the mass storage device. Once the mass storage device is prepared the booting method comprises loading the operating system modules into the system random access memory of the computing system, verifying the contents of the mass storage device by executing the instructions contained within the mass storage verification module to generate a set of computed verification data, and permitting the computing system to execute the instructions contained within the gaming application modules only if the set of computed verification data matches the mass storage verification data; The set of computed verification data comprises a file name, a file starting location on the mass storage device, a file size, and a CRC checksum for each file stored on the mass storage device.

Yet another aspect of the present invention is a system for verifying the computer readable data stored upon a mass storage device attached to a computing system before the contents of the mass storage system are accessed by the gaming modules. The system comprises a mass storage verification module having a set of computer executable instructions for use in verifying the contents of the mass storage device, one or more operating system module having a set of computer executable instruction, one or more application module having a set of computer executable instruction; and mass storage verification data for use in verifying the contents of the mass storage device. The system comprises a computer processing module for executing computer instructions stored on the mass storage device, random access memory coupled to the computer processing module, and the mass storage device coupled to the computer processing module for storing the computer readable data used by the computing system. The computer processing module executes the instructions contained within the mass storage verification module to verify the contents of the mass storage device before executing any application modules. The mass storage verification module performs the following operations to verify the contents of the mass storage device: loading the operating system modules into the system random access memory of the computing system, verifying the contents of the mass storage device by generating a set of computed verification data based upon the computer readable data stored on the mass storage device, permitting the computing system to execute the instructions contained within the gaming application modules only if the set of computed verification data matches the mass storage verification data, and shutting down the operation of the computing system if access to not permitted to the computer readable data stored upon the mass storage device. The set of computed verification data comprises a file name, a file starting location on the mass storage device, a file size, and a CRC checksum for each file stored on the mass storage device.

Yet another aspect of the present invention is a computer controlled gaming machine. The gaming machine comprises a computer processing module for executing computer instructions stored on the mass storage device, random access memory coupled to the computer processing module, and a mass storage device coupled to the computer processing module for storing computer readable data used by the computing system. The computer readable data comprises a mass storage verification module having a set of computer executable instructions for use in verifying the contents of the mass storage device, one or more gaming application modules having a set of computer executable instruction, and mass storage verification data for use in verifying the contents of the mass storage device. The computer processing module executes the instructions contained within the mass storage verification module to verify the contents of the mass storage device before executing any application modules.

Yet another aspect of the present invention is an apparatus for booting a computing system having a processor, a mass storage device, and system random access memory. The mass storage device containing computer readable data. The apparatus comprises a means for storing onto the mass storage device a mass storage verification module having a set of computer executable instructions for use in verifying the contents of the mass storage device, means for storing onto the mass storage device a mass storage verification data for use in verifying the contents of the mass storage device, and a means for storing a plurality of operating system modules having a set of computer executable instructions within a file system on the mass storage device. The apparatus further includes the following modules for use once the computer readable data is stored on the mass storage device: a means for loading the operating system modules needed to access the computer readable data stored on the mass storage device into the random access memory of the computing system, a means for verifying the contents of the mass storage device by executing the instructions contained within the mass storage verification module to generate a set of computed verification data, and a means for permitting additional access to the computer readable data stored on the mass storage device only if the set of computed verification data matches the mass storage verification data. The set of computed verification data comprises a file name, a file starting location on the mass storage device, a file size, and a CRC checksum for each file stored on the mass storage device.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 illustrates the computer readable data found within the Mass Storage Verification Data module according to yet another embodiment of the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The embodiments of the invention described herein are implemented as logical operations in a telecommunications system having connections to a distributed network such as the Internet. The logical operations are implemented (1) as a sequence of computer implemented steps running on a computer system and (2) as interconnected machine modules running within the computing system. This implementation is a matter of choice dependent on the performance requirements of the computing system implementing the invention. Accordingly, the logical operations making up the embodiments of the invention described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto.

The present invention provides a system and method for verifying the contents of a mass storage device before granting access to computer readable data stored on the device. In the preferred embodiment, the computing system is a computer controlled gaming machine in which the only mass storage device is a read-only drive such as a CD-ROM or DVD-ROM drive. One skilled in the art will recognize that the present invention may be used with any mass storage device attached to any computing system without deviating from the spirit and scope of the present invention.

Figure 1:
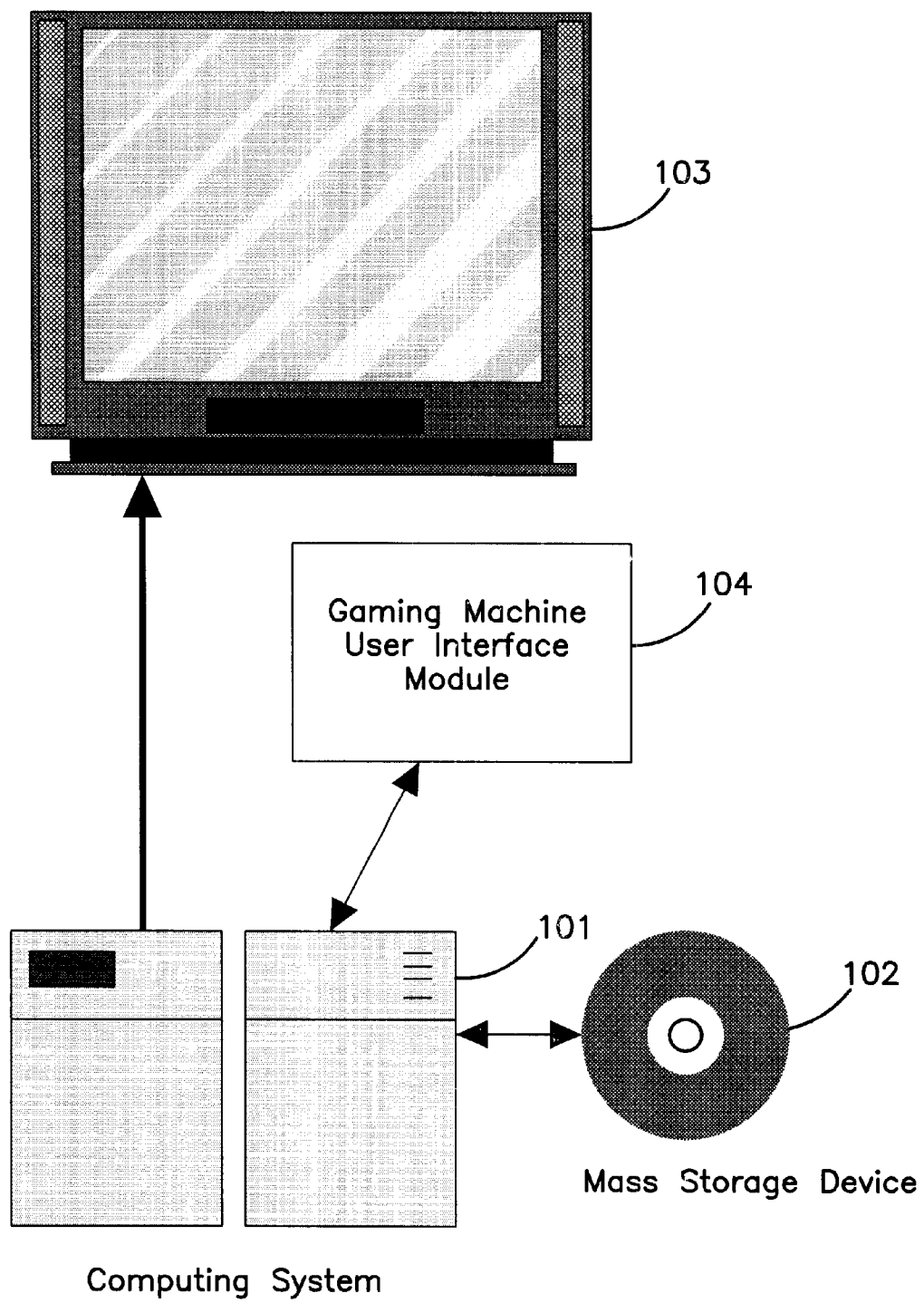
FIG. 1 illustrates a computing system using a CD-ROM as a mass storage device according to one embodiment of the present invention.

FIG. 1 illustrates a computing system using a CD-ROM as a mass storage device according to one embodiment of the present invention. The present invention relates to a system and method for verifying the contents of a mass storage device 102 attached to a computing system 101 for use in storing application modules and data within a file system. The computing system 101 executes the application modules stored on the mass storage device 102 to generate images to be displayed on a display device 103, including but not limited to, a local video display, controlled by a Gaming Machine User Interface module 104, based upon instructions and data contained on the mass storage device 102.

Figure 2:
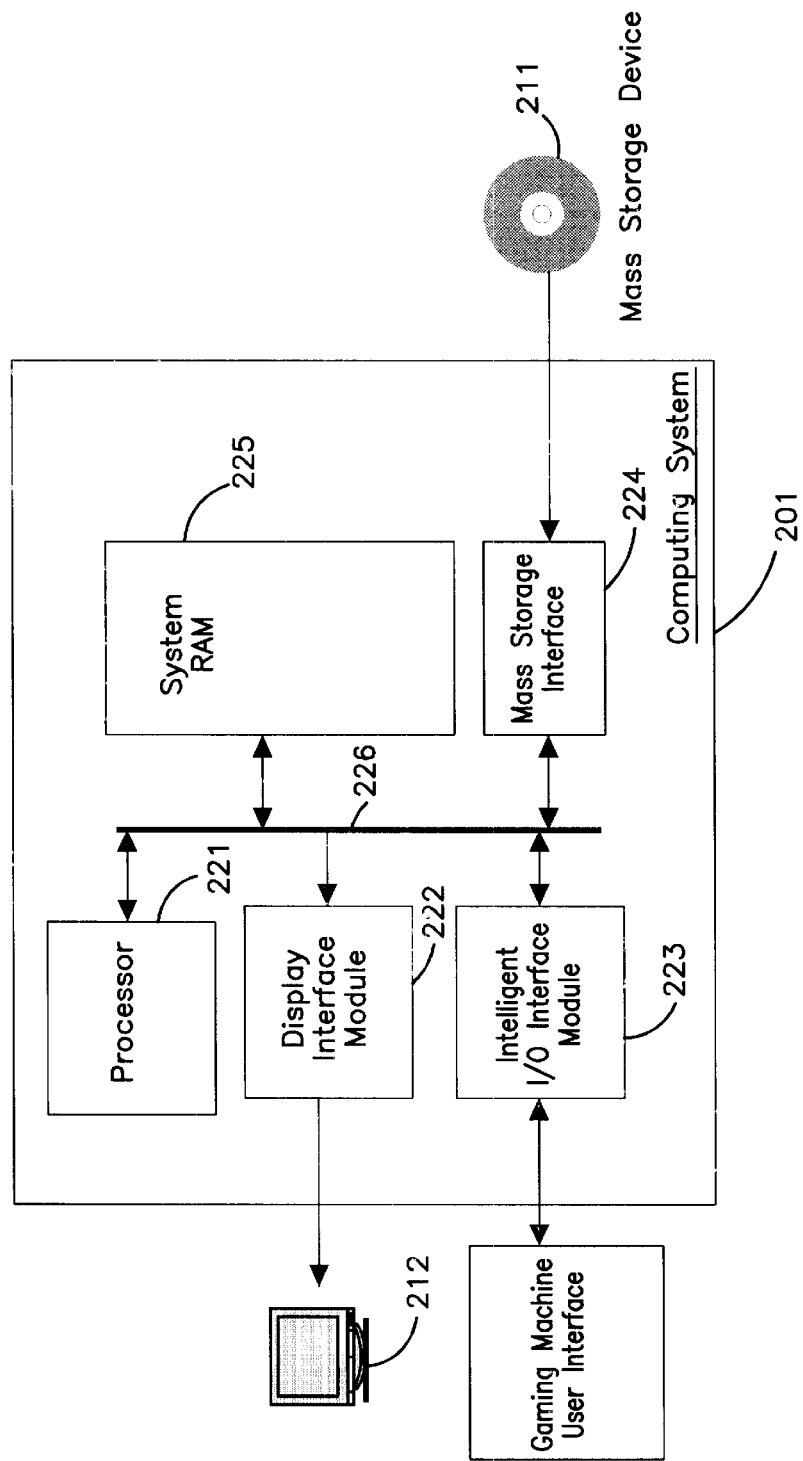
FIG. 2 illustrates a computing system used to implement a computer controlled gaming machine according to another embodiment of the present invention.

In the preferred embodiment, the computing system 101 is implemented using a computing system typically referred to as a personal computer as illustrated in FIG. 2. The computing system typically uses a PCI and ISA or PC-104 type system busses to implement the system communications bus 225. This choice to implement the preferred embodiment permits the main processing module 221, the display interface module 222, and the mass storage interface module 224 to be implemented with a wide variety of commonly available system components. This choice also permits the periodic improvement of the computing system 201 with the upgrade of one of these modules as new and faster computing modules become available. The preferred embodiment utilizes a main processing module 222 based upon a Pentium II processor manufactured by the Intel Corp. One of ordinary skill in the art will recognize that this processing unit may be based upon any number of alternate processing units manufactured by Advanced Micro Devices and other manufacturers as well as a PowerPC processor manufactured by IBM Corporation and Motorola.

The computing system 201 has a block of system random access memory (RAM) 225 for use in storing application modules and data for use when implementing a gaming machine. Finally, the computing system 201 has an intelligent input and output interface module (IIOB) 223 for interfacing the computing system 201 with a plurality of gaming machine interface devices 213 such as a hopper, bill acceptor, meters, input panels, and the like. The technical description of the IIOB may be found in detail in a co-pending U.S. Patent Application, entitled, System and Method for Providing a Real-Time Programmable Interface to a General-Purpose Non-Real-Time Computing System, Ser. No. 09/395,647, which is concurrently filed with the present application and is incorporated by reference in its entirety herein.

Additionally, the preferred embodiment of the computing system 201 utilizes a commercially available operating system, such as the Linux operating system available from Walnut Creek CD-ROM as the 'Slackware' distribution. The operating system is stored upon mass storage device 211 for execution with the main processing module to provide device driver support for the peripheral devices used to implement the system.

Figure 3:
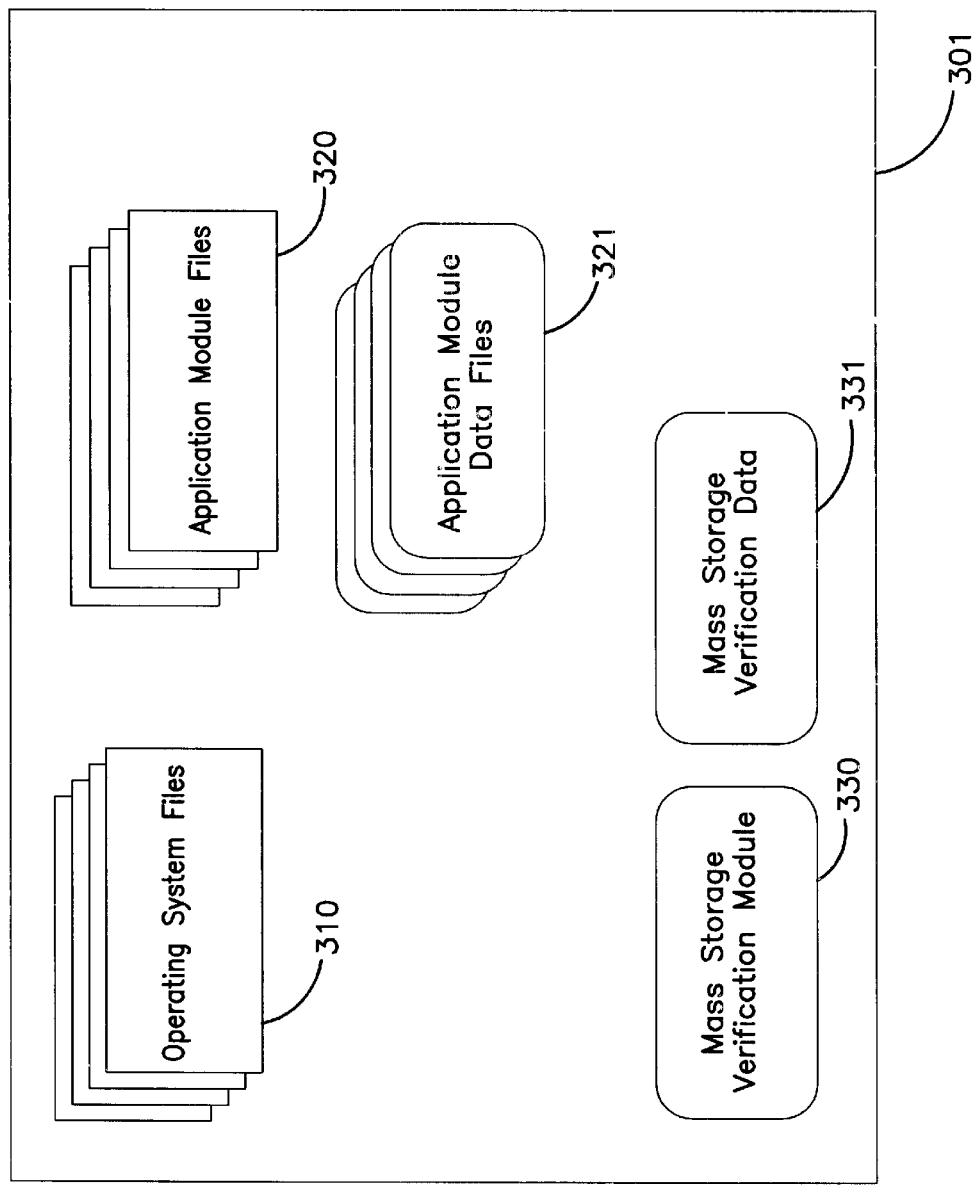
FIG. 3 illustrates the contents found on the mass storage device according to one possible embodiment of the present invention.

FIG. 3 illustrates the contents found on the mass storage device according to one possible embodiment of the present invention. The computer readable data stored upon the mass storage device 211 includes a plurality of different data modules. Typically, these data modules are organized into a hierarchical file system 301 and includes one or more operating system files 310, one or more application module files 320, and one or more application module data files 321. According to one embodiment of the present invention, these data modules further includes a mass storage verification module file 330 and a mass storage verification data file 331.

In the preferred embodiment, the application module file 320 and the application module data files 321 are the application program and data files used by the computing system 201 to generate the images, sounds, and user interactions needed to create a computer controlled gaming machine. The operating system files 310 include all of the files needed to implement an operating system on the computing system 201 that is needed to support the execution of the gaming application programs. The mass storage verification module 330 is an application program run before any data is permitted to be accessed by a gaming application to verify the contents of the mass storage device are valid. The mass storage verification data file 331 contains data utilized by the mass storage verification module 330 when performing its operations.

FIG. 4 illustrates the computer readable data found within the Mass Storage Verification Data module 401 according to yet another embodiment of the present invention. The mass storage verification module 330, as discussed in more detail below, determines a set of computed verification data for each file found on the mass storage device 211. This computed verification data is compared with a previously generated set of verification data that is stored in the mass storage verification data file 401. The contents of the mass storage device 211 is considered to be verified and usable if the computed verification data for each file on the mass storage device 211 matches its corresponding entry in the mass storage verification data file 401. If all of these values do not match, then the mass storage device is considered corrupted and should not be used.

The computed verification data includes a set of unique data that can be used to act as a signature for each file. Any particular set of file parameters may be used for the set of verification data so long as it is unique to each file. In the preferred embodiment, the set of verification data determined and used to identify each file includes a file name, a file full path name, a file size in bytes, and a 16-bit CRC checksum computed using the contents of the file.

When the mass storage device is created for installation in the computing system 201, each of the entries in the mass storage verification data file is determined and stored within the data file 401. The data file itself 401 is stored on the mass storage device along with the mass storage verification module 330. If any files are changed on this mass storage device 211 without updating the entries within the mass storage verification data file 401, the mass storage device 211 will not successfully pass the verification procedure.

In the preferred embodiment, the mass storage device is a read-only drive such as a CD-ROM or a DVD-ROM drive. In the gaming environment, the computer programs and data files used in machines capable of accepting wagers need to have the contents of the mass storage devices approved by official regulators to ensure the game performs as advertised. The gaming machine will not be permitted to access the programs and data on the mass storage device unless it passes the verification procedure. This process will allow both regulators and game players to have confidence that the gaming machine has not been tampered with by anyone since being inspected and approved by the proper authorities.

Figure 5:
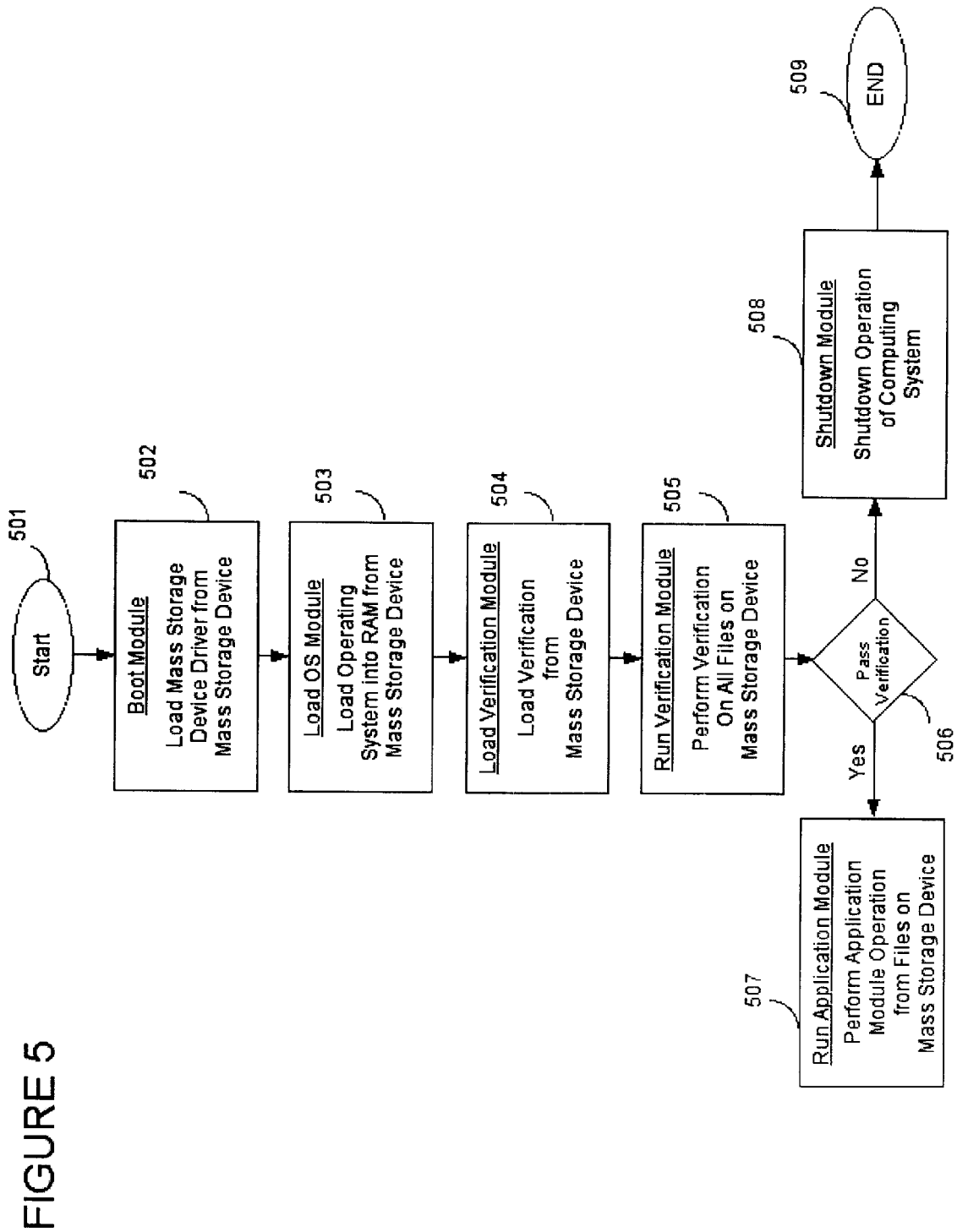
FIG. 5 illustrates an operational flow diagram for a computer boot procedure according to another embodiment of the present invention.

FIG. 5 illustrates an operational flow diagram for a computer boot procedure according to another embodiment of the present invention. While FIG. 5 illustrates the use of the verification process during a boot procedure in which the operating system is stored on the mass storage device, one skilled in the art will recognize that this procedure is also applicable to a similar process in which a mass storage device is being mounted onto a computing system 201 as an additional mass storage device. Additionally, a similar procedure may be utilized whenever a subset of a mass storage device is being accessed such as when an application program is launched. All of these variations may be made to the present invention without deviating from the spirit and scope of the invention recited in the claims attached hereto.

As typically occurs when a computing system boots, a boot module 502 executes a set of computer instructions from a BIOS ROM to load a device driver from the mass storage device. The computing system 201 then uses the device driver to load the operating system into the system RAM 225 in a Load OS module 503. Before the boot process permits any application modules to access the data stored on the mass storage device 211, the mass storage verification module 330 is loaded into the system RAM 225 in the Load Verification Module 504 and then executed in the Run Verification Module 505.

In the preferred embodiment, the Load OS module 503 will load the entire operating system into the system RAM 225 before the Load Verification module 504 will begin operation. Of course, this process may be modified to load only enough of the operating system that is needed to access the files stored on the mass storage device 211 and perform the verification operations before the verification process begins. In such a system, the remaining portions of the operating system may be loaded and configured after the verification procedure successfully completes. In either arrangement, the results of the Run Verification Module 505 are checked in operation 506. If the mass storage device 211 passes the verification procedure, the run application module 507 will execute an application process such a gaming application module. If the mass storage device 211 fails the verification procedure, the shutdown module 508 will shutdown the operation of the computing system 201 in a orderly fashion.

Figure 6:
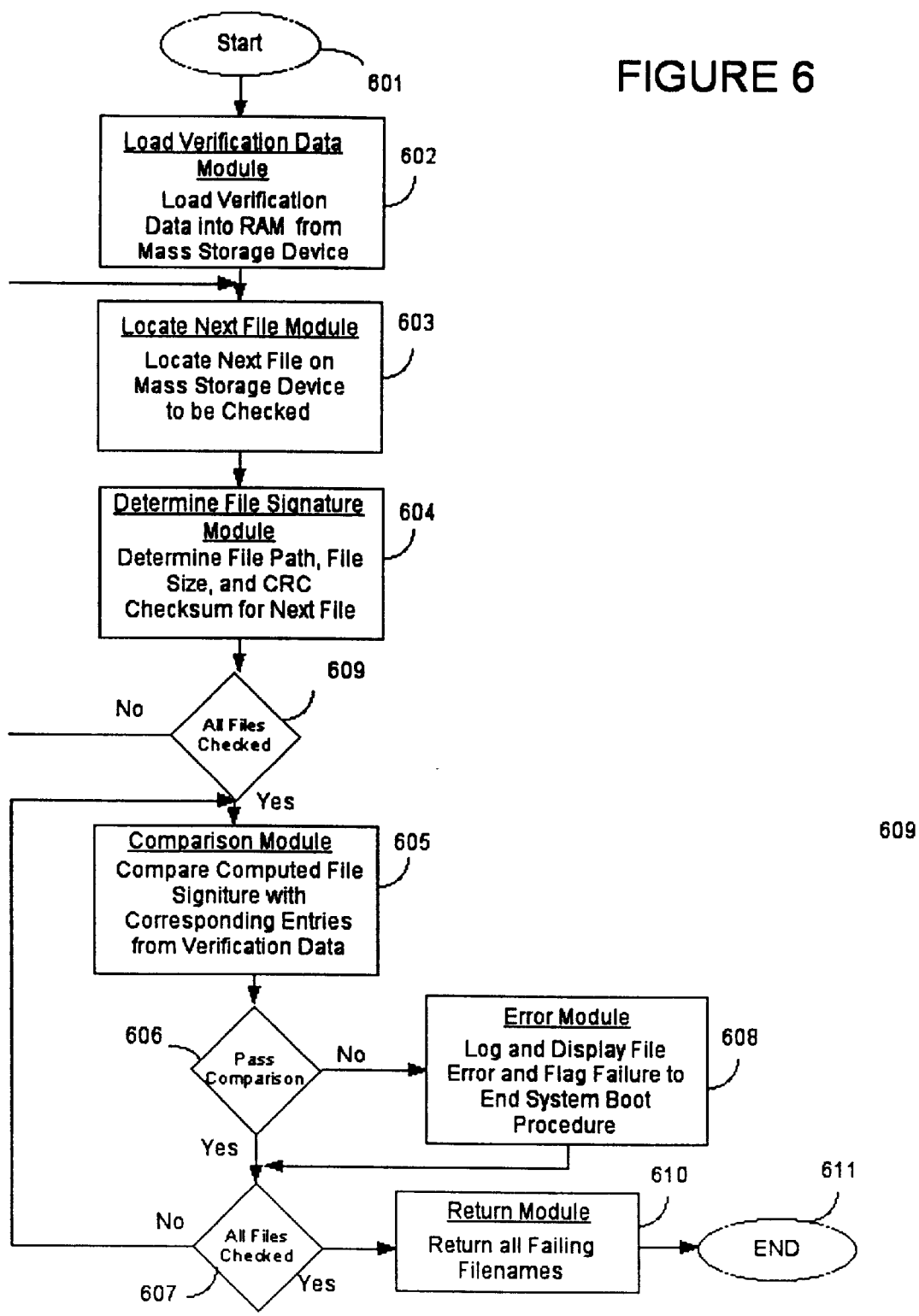
FIG. 6 illustrates an operational flow diagram for the mass storage media verification module according to yet another possible embodiment of the present invention.

FIG. 6 illustrates an operational flow diagram for the mass storage media verification module 505 according to yet another possible embodiment of the present invention. The mass storage verification module is first loaded into the system RAM 225 of the computing system 201 in the load verification module 504. Next the verification data file 331 is loaded into system RAM 225 in the Load Verification Data Module 602.

The verification procedure consists of a main loop that begins with a Locate Next File Module 603. In this module 603, the next file to be analyzed by the procedure is located. The Determine File Signature Module 604 is executed next to calculate the verification data for the current file being analyzed. This process continues until all of the files located upon the mass storage device have been analyzed using test operation 609.

Once the all of verification signature data is calculated, a Comparison Module 605 compares the computed verification data with all of the corresponding entries within the mass storage verification data file 331. A Pass Comparison test operation 606 determines if each file has passed the comparison test. If the Pass comparison test operation is successful, this process continues until all of the entries have been checked using test operation 607.

Returning to Pass Comparison test operation 606, if the current entry does not pass the comparison of the computed verification data and the previously stored verification data, the procedure executes an Error Module 608 to log and flag the failure for further analysis. This procedure once again continues to check all of the entries in the computed and stored verification data files to identify all of the files that fail the verification procedure using test operation 607. The process concludes with a return of all of the files that did not pass the verification test in operation 610. Of course, the procedure may compute and check the files one-by-one and terminate upon finding a file that fails the verification test without deviating from the spirit and scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for verifying the contents of a mass storage device attached to a computing system having a processor and system random access memory, the mass storage device having a plurality of data files containing computer readable data stored therein, the method comprising:

storing onto the mass storage device a plurality of user data files containing software modules and corresponding data used to control the operation of the computing system;

storing onto the mass storage device a mass storage verification module having a set of computer executable instructions for use in verifying the contents of the mass storage device, the mass storage verification module having one or more data files associated therewith;

storing onto the mass storage device a mass storage verification data within a mass storage verification data file, the mass storage verification data file having an individual set of verification data corresponding to each data file stored within the mass storage device for use in verifying the contents of the mass storage device; and before permitting an initial access to the computer readable data from the mass storage device, verifying the contents of the mass storage device by executing the instructions contained within the mass storage verification module to generate a set of computed verification data for each data file stored within the mass storage device;

comparing the set of computed verification data for each data file on the mass storage device with the corresponding individual sets of mass storage verification data contained within the mass storage verification data file;

permitting additional access to the computer readable data stored on the mass storage device only if each of the sets of computed verification data exactly matches the corresponding individual sets of mass storage verification data contained within the mass storage verification data file;

wherein the set of computed verification data comprises a file name, a file starting location on the mass storage device, a file size, and a CRC checksum for each file stored on the mass storage device.

2. The method according to claim 1, the method further comprises:

storing a plurality of operating system modules having a set of computer executable instructions within the file system on the mass storage device;

storing a plurality of application modules having a set of computer executable instructions within a file system on the mass storage device; and loading the operating system modules into the system random access memory of the computing system if access is permitted to the computer readable data stored the mass storage device.

3. The method according to claim 2, the method further comprises shutting down the operation of the computing system if access is not permitted to the computer readable data stored upon the mass storage device.

4. The method according to claim 3, wherein the mass storage device possess only a read-only storage media.

5. The method according to claim 4, wherein the mass storage device is a CD-ROM drive.

6. The method according to claim 5, wherein the mass storage device is a DVD-ROM drive.

7. The method according to claim 1, wherein the set of computed verification data comprises a file name, a file starting location on the mass storage device, a file size, and a CRC checksum for each file stored on the mass storage device.

8. The method according to claim 7, wherein the file starting location comprises a track identifier and a block identifier for the first block in each file stored on the mass storage device.

9. The method according to claim 7, wherein the file starting location comprises a path name in the file system for each file stored on the mass storage device.

10. A method for booting a computing system having a processor, a mass storage device, and system random access memory, the mass storage device containing computer readable data, the method comprising:

storing onto the mass storage device a plurality of user data files containing software modules and corresponding data used to control the operation of the computing system;

storing onto the mass storage device a mass storage verification module having a set of computer executable instructions for use in verifying the contents of the mass storage device, the mass storage verification module having one or more data files associated therewith;

storing onto the mass storage device a mass storage verification data within a mass storage verification data file, the mass storage verification data file having an individual set of verification data corresponding to each data filed stored within the mass storage device for use in verifying the contents of the mass storage device;

storing a plurality of operating system modules having a set of computer executable instructions within a file system on the mass storage device, the plurality of operating system modules being stored within a plurality of individual files on the mass storage device;

loading the operating system modules needed to access the computer readable data stored on the mass storage device into the random access memory of the computing system;

verifying the contents of the mass storage device by executing the instructions contained within the mass storage verification module to generate a set of computed verification data for each data file stored within the mass storage device;

comparing the set of computed verification data for each data file on the mass storage device with the corresponding individual sets of mass storage verification data contained within the mass storage verification data file; and permitting additional access to the computer readable data stored on the mass storage device only if each of the sets of computed verification data exactly matches the corresponding individual sets of mass storage verification data contained within the mass storage verification data file;

wherein the set of computed verification data comprises a file name, a file starting location on the mass storage device, a file size, and a CRC checksum for each file stored on the mass storage device.

11. The method according to claim 10, wherein the mass storage device possess only a read-only storage media.

12. The method according to claim 11, wherein the mass storage device is a CD-ROM drive.

13. The method according to claim 11, wherein the mass storage device is a DVD-ROM drive.

14. The method according to claim 10, wherein the file starting location comprises a track identifier and a block identifier for the first block in each file stored on the mass storage device.

15. The method according to claim 10, wherein the file starting location comprises a path name in the file system for each file stored on the mass storage device.

16. A method for booting a computer controlled gaming machine having a computing system, the computing system has a processor, a mass storage device, and system random access memory and the mass storage device contains computer readable data organized within a file system, the method comprising:

storing onto the mass storage device a plurality of user data files containing software modules and corresponding data used to control the operation of the computing system;

storing onto the mass storage device a mass storage verification module having a set of computer executable instructions for use in verifying the contents of the mass storage device, the mass storage verification module having one or more data files associated therewith;

storing onto the mass storage device a mass storage verification data within a mass storage verification data file, the mass storage verification data file having an individual set of verification data corresponding to each data filed stored within the mass storage device for use in verifying the contents of the mass storage device;

storing a plurality of operating system modules having a set of computer executable instructions within a file system on the mass storage device, the plurality of operating system modules being stored within a plurality of individual files on the mass storage device;

loading the operating system modules needed to access the computer readable data stored on the mass storage device into the random access memory of the computing system;

verifying the contents of the mass storage device by executing the instructions contained within the mass storage verification module to generate a set of computed verification data for each data file stored within the mass storage device;

comparing the set of computed verification data for each data file on the mass storage device with the corresponding individual sets of mass storage verification data contained within the mass storage verification data file; and permitting additional access to the computer readable data stored on the mass storage device only if each of the sets of computed verification data exactly matches the corresponding individual sets of mass storage verification data contained within the mass storage verification data file;

wherein the set of computed verification data comprises a file name, a file starting location on the mass storage device, a file size, and a CRC checksum for each file stored on the mass storage device.

17. The method according to claim 16, wherein the mass storage device has only read-only storage media.

18. The method according to claim 17, wherein the mass storage device is a CD-ROM drive.

19. The method according to claim 17, wherein the mass storage device is a DVD-ROM drive.

20. The method according to claim 16, the method further comprises shutting down the operation of the computing system if access to not permitted to execute the gaming application modules stored upon the mass storage device.

21. A computer-readable medium readable by a computing system and encoding a computer program of instructions for executing a computer process performing the method recited in claim 1.

22. A computer-readable medium readable by a computing system and encoding a computer program of instructions for executing a computer process performing the method recited in claim 10.

23. A computer-readable medium readable by a computing system and encoding a computer program of instructions for executing a computer process performing the method recited in claim 16.

24. A computer data signal embodied in a carrier wave readable by a computing system and encoding a computer program of instructions for executing a computer process performing the method recited in claim 1.

25. A computer data signal embodied in a carrier wave readable by a computing system and encoding a computer program of instructions for executing a computer process performing the method recited in claim 10.

26. A computer data signal embodied in a carrier wave readable by a computing system and encoding a computer program of instructions for executing a computer process performing the method recited in claim 16.

27. A system for verifying the computer readable data stored upon a mass storage device attached to a computing system before the contents of the mass storage system are accessed by the computing system, the computer readable data comprises a mass storage verification module having a set of computer executable instructions for use in verifying the contents of the mass storage device, one or more operating system module having a set of computer executable instruction, one or more application module having a set of computer executable instruction; and mass storage verification data for use in verifying the contents of the mass storage device, the system comprising:
 a computer processing module for executing computer instructions stored on the mass storage device;
 random access memory coupled to the computer processing module;
 the mass storage device coupled to the computer processing module for storing the computer readable data used by the computing system;
 wherein
  the computer processing module executes the instructions contained within the mass storage verification module stored on the mass storage device to verify the contents of the mass storage device before executing any application modules;
  the mass storage verification module performs the following operations to verify the contents of the mass storage device:
   loading the operating system modules from the mass storage device into the system random access memory of the computing system;
   verifying the contents of the mass storage device by generating a set of computed verification data based upon the computer readable data stored on the mass storage device;
   permitting the computing system to execute the instructions contained within the gaming application modules only if the set of computed verification data exactly matches the mass storage verification data contained within a mass storage verification data file on the mass storage device; and
   shutting down the operation of the computing system if access is not permitted to the computer readable data stored upon the mass storage device; and
  the set of computed verification data comprises a file name, a file starting location on the mass storage device, a file size, and a CRC checksum for each file stored on the mass storage device.

28. The method according to claim 27, wherein the file starting location comprises a path name in the file system for each file stored on the mass storage device.

29. The system according to claim 27, wherein the file starting location comprises a track identifier and a block identifier for the first block in each file stored on the mass storage device.

30. The method according to claim 27, wherein the mass storage device possess only a read-only storage media.

31. The method according to claim 30, wherein the mass storage device is a CD-ROM drive.

32. The method according to claim 30, wherein the mass storage device is a DVD-ROM drive.

33. A computer controller gaming machine, the gaming machine comprising:
 a computer processing module for executing computer instructions stored on the mass storage device;
 random access memory coupled to the computer processing module;
 the mass storage device coupled to the computer processing module for storing computer readable data used by the computing system;
 wherein the computer readable data stored on the mass storage device comprises:
  a mass storage verification module having a set of computer executable instructions for use in verifying the contents of the mass storage device;
  one or more gaming application modules having a set of computer executable instruction; and
  mass storage verification data for use in verifying the contents of the mass storage device; and
 the computer processing module executes the instructions contained within the mass storage verification module to verify the contents of the mass storage device before executing any application modules;
 wherein the mass storage verification module verifies the contents of the mass storage device by calculating a set of computed verification data for each file on the mass storage device, the set of computed verification data comprises a file name, a file starting location on the mass storage device, a file size, and a CRC checksum for each file stored on the mass storage device; and
 the mass storage verification module determines that the contents of the mass storage device is verified if the set of computed verification data exactly matches the corresponding set of mass storage verification data read from the mass storage device.

34. The gaming machine according to claim 33, wherein
 the computer readable data further comprises one or more operating system modules having a set of computer executable instructions; and
 the mass storage verification module performs the following operations to verify the contents of the mass storage device:
  loading the operating system modules that are needed to access the computer readable data stored upon the mass storage device into the system random access memory of the computing system;
  verifying the contents of the mass storage device; and
  shutting down the operation of the gaming machine if the mass storage verification module is unable to verify the computer readable data stored upon the mass storage device.

35. The gaming machine according to claim 34, wherein the verifying the contents of the mass storage device comprises:

performing the instructions contained within the mass storage verification module to generate a set of computed verification data, the set of computed verification data comprises a file name, a file starting location on the mass storage device, a file size, and a CRC checksum for each file stored on the mass storage device; and comparing the set of computed verification data with the mass storage verification data.

36. The gaming machine according to claim 33, wherein the mass storage device possess only a read-only storage media.

37. The gaming machine according to claim 36, wherein the mass storage device is a CD-ROM drive.

38. The gaming machine according to claim 36, wherein the mass storage device is a DVD-ROM drive.

39. An apparatus for booting a computing system having a processor, a mass storage device, and system random access memory, the mass storage device containing computer readable data, the apparatus comprising:

means for storing onto the mass storage device a mass storage verification module having a set of computer executable instructions for use in verifying the contents of the mass storage device;

means for storing onto the mass storage device a mass storage verification data for use in verifying the contents of the mass storage device;

means for storing a plurality of operating system modules having a set of computer executable instructions within a file system on the mass storage device;

means for loading the operating system modules needed to access the computer readable data stored on the mass storage device into the random access memory of the computing system;

means for verifying the contents of the mass storage device by executing the instructions contained within the mass storage verification module to generate a set of computed verification data; and means for permitting additional access to the computer readable data stored on the mass storage device only if the set of computed verification data exactly matches the mass storage verification data;

wherein the set of computed verification data comprises a file name, a file starting location on the mass storage device, a file size, and a CRC checksum for each file stored on the mass storage device.

* * * * *